United States Patent [19]
McKay et al.

[11] Patent Number: 5,827,916
[45] Date of Patent: Oct. 27, 1998

[54] FORMULATED ETHYLENE α-OLEFIN ELASTOMERIC COMPOUNDS

[75] Inventors: Kevin W. McKay, Baton Rouge; Robert R. Blanchard, Brusly; Edwin R. Feig, Baton Rouge, all of La.

[73] Assignee: The Dow Chemical Company, Midland, Mich.

[21] Appl. No.: 803,850

[22] Filed: Feb. 28, 1997

Related U.S. Application Data

[63] Continuation of Ser. No. 572,325, Dec. 14, 1995, abandoned, which is a continuation of Ser. No. 436,775, May 8, 1995, abandoned, which is a division of Ser. No. 945,035, Sep. 15, 1992, Pat. No. 5,414,040.

[51] Int. Cl.$^6$ ....................................................... C08K 3/26
[52] U.S. Cl. ......................... 524/425; 524/437; 524/445; 524/515; 524/581
[58] Field of Search .................................... 524/515, 581, 524/425, 437, 445

[56] References Cited

U.S. PATENT DOCUMENTS

| | | | |
|---|---|---|---|
| 3,645,992 | 2/1972 | Elston | 260/88.2 |
| 4,575,522 | 3/1986 | Breach et al. | 523/220 |
| 4,673,620 | 6/1987 | Shulman et al. | |
| 4,843,129 | 6/1989 | Spenadel et al. | |
| 5,011,891 | 4/1991 | Spenadel et al. | |
| 5,246,483 | 9/1993 | Spenadel et al. | |
| 5,300,581 | 4/1994 | Otawa et al. | 525/301 |

FOREIGN PATENT DOCUMENTS 9304486  3/1993  WIPO.

OTHER PUBLICATIONS

*Modern Plastics Encyclopedia*, vol. 65, No. 11, pp. 264–268, 1989, "Introduction to Injection Molding" by H. Randall Parker.

*Modern Plastics Encyclopedia*, vol. 65, No. 11, pp. 270–272, 1989, "Injection Molding Thermoplastics" by Michael W. Green.

*Modern Plastics Encyclopedia*, vol. 65, No. 11, pp. 217–218, 1989, "Extrusion–Blow Molding" by Christopher Irwin.

"Flexome™ Polyolefins: A Bridge Between Polyethylene and Rubbers" by M. R. Rifi, H. K. Ficker and M. A. Corwin, pp. 1–7, 1990. Union Carbide Chemicals and Plastics Inc., Bound Brock, New Jersey.

*Proceedings of the First International Business Forum of Speciality Polyolefins SPO '91,* Sep. 1991, pp. 41–55, "The Marketing Challenge by Single Site Catalysts in Polyolefins" by Michael Jefferies.

*Polyolefins VII International Conference,* pp. 45–66, Feb. 1991, "Structure/Property Relationships in Exxpo™ Polymers" by C. S. Speed, B. C. Trudell, A. K. Mehta and F. C. Stehling.

*Tappi Journal,* Feb. 1992, pp. 99–103, "A New Family of Linear Ethylene Polymers Provides Enhanced Sealing Performance" by Dirk G. F. Van der Sanden and Richard W. Halle.

*Proceedings of the 1991 IEEE Engineering Society,* pp. 184–190, Sep. 1990, "New Speciality Linear Polymers (SLP) For Power Cables" by Monica Hendewerk and Lawrence Spenadel.

*Encyclopedia of Polymer Science and Technology,* vol. 6, pp. 359–386, 1967, "Ethylene Polymers" by H. N. Friedlander.

*Enclyclopedia of Polymer Science and Technology,* vol. 6, pp. 522–525, 562, 1986, "Ethylene–Propylene Elastomers" by Gary Ver Strate.

*Vistalon®Ethylene–Propylene Rubber User's Guide,* Section 1, 2 and 10, pp. 1–2, 1–3, and 1–2, 10, 12–14, 1988, Exxon Chemical Company.

*Primary Examiner*—David W. Wu

[57] ABSTRACT

Formulated compositions having good uncured ("green") and cured physical properties are disclosed. The compositions comprise at least one substantially linear ethylene/$C_3$–$C_{20}$ α-olefin copolymer, or alternately, at least one linear ethylene/$C_5$–$C_{20}$ α-olefin copolymer. The compositions are easily molded and have particular utility in making wire and cable coatings.

12 Claims, No Drawings

FORMULATED ETHYLENE α-OLEFIN ELASTOMERIC COMPOUNDS

CROSS-REFERENCE TO RELATED APPLICATIONS

This application is a continuation of application Ser. No. 08/572,325 filed Dec. 14, 1995, now abandoned; which is a continuation of application Ser. No. 08/436,775 filed May 8, 1995, now abandoned; which is a divisional of application Ser. No. 07/945,035, filed Sep. 15, 1992, now U.S. Pat. No. 5,414,040. This application is related to application Ser. No. 07/776,130, filed Oct. 15, 199, now U.S. Pat. No. 5,272,236; to application Ser. No. 07/939,281 filed Sep. 2, 1992, now U.S. Pat. No. 5,278,272; to application Ser. No. 07/945,034 filed Sep. 15, 1992, now abandoned; to application Ser. No. 08/436,779, filed on May 8, 1995, now U.S. Pat. No. 5,580,920, which was a divisional of application Ser. No. 08/945,035, filed Sep. 15, 1992, now U.S. Pat. No. 5,414,040; the disclosures of each of which are incorporated herein by reference.

FIELD OF THE INVENTION

This invention relates to compositions comprising specific ethylene/α-olefin polymers. The compositions have improved green strength, higher filler/plasticizer/oil loading capabilities and improved peroxide cure efficiency. The polymers comprise either:

(A) at least one substantially linear ethylene/$C_3$–$C_{20}$ α-olefin polymer having specific processing characteristics, or (B) at least one linear ethylene/α-olefin polymer, wherein the α-olefin is a $C_5$–$C_{20}$ α-olefin.

Such compositions are useful in the automotive area, industrial goods, building and construction, electrical (e.g., wire and cable coatings/insulation) and tire products.

BACKGROUND OF THE INVENTION

Polymers and numerous additives are typically compounded into formulations and subsequently cross-linked for enhanced strength properties of the finished article. Additives which can be added into the formulation, depending upon the application, include oil, fillers (e.g., carbon black, talc, magnesium hydroxide, or calcium carbonate), co-agents (e.g., triallyl cyanurate) and cross-linking agents (usually peroxide). These formulations are first compounded and mixed thoroughly to enable the various ingredients to compatibilize, since the compositions usually contain a relatively high percentage of filler. In the case of a wire and cable coating operation, the compositions coat the wire and are subsequently cross-linked to stabilize the composition.

The formulated composition must have physical properties which are often mutually exclusive, depending upon the choice of the polymer. For example, the composition must have "green strength" to remain on the wire after coating, and not sag or deform on the wire until the composition is cured, otherwise the wire will have thin spots and the insulating value of the composition is lost. The composition must also undergo a cure step and maintain good physical properties, such as tensile strength, elongation, and 100% modulus (stress at 100% strain).

Usually the polymer selected to compatibilize all of the various components is an elastomer such as ethylene/propylene rubber (EPM) or ethylene/propylene diene monomer terpolymer (EPDM). These types of very low density polymers are relatively expensive (as compared with traditional linear low density polyethylene polymers) and contain a very high percentage by weight of co-monomer(s). Lowering the density of the polymer increases the ability of the polymer to hold more filler and oil. But as the polymer density decreases, the modulus of the polymer decreases, the overall composition loses uncured modulus (100% modulus) or "green strength" and performs unsatisfactorily.

There have been a few recent announcements regarding new polymers which are said to be effective substitutes for EPM and EPDM. Union Carbide Chemicals and Plastics Inc. announced in 1990 that they have developed a new cost effective class of polyolefins trademarked Flexomer™ Polyolefins that could replace expensive EPM or EPDM rubbers. These new polyolefins are said to have bridged the gap between rubbers and polyethylene, having moduli between the two ranges.

In a paper presented on Sep. 22–27, 1991 at the 1991 IEEE Power Engineering Society Transmission and Distribution Conference ("New Specialty Linear Polymers (SLP) For Power Cables," printed in the proceedings on pp. 185–190) in Dallas, Tex., Monica Hendewerk and Lawrence Spenadel, of Exxon Chemical Company, report that Exxon's Exact™ polyolefin polymers, said to be produced using single site catalyst technology, are useful in wire and cable coating applications. The new polymers are linear and said to have narrow molecular weight distributions, and, because of the narrow molecular weight distribution, are also said to have "the potential for melt fracture." The physical properties of filled and cross-inked formulations comprising Exact™ polymers are favorably compared with formulations comprising EP polymers in this publication. In a similar vein, in "A New Family of Linear Ethylene Polymers Provides Enhanced Sealing Performance" by Dirk G. F. Van der Sanden and Richard W. Halle, (February 1992 Tappi Journal), Exxon Chemical Company has also taught that the molecular weight distribution of a polymer is described by the polymers melt index ratio (i.e., $I_{10}/I_2$) and that their new narrow molecular weight distribution polymers made using a single site catalyst are "linear backbone resins containing no functional or long chain branches."

While the development of new lower modulus polymers such as Flexomer™ Polyolefins by Union Carbide or Exact™ polymers by Exxon has aided the elastomeric formulation marketplace, there continues to be a need for other more advanced, cost-effective polymers for compounding with reasonable loadings of various fillers which improves or maintains physical properties such as "green strength" and also improves cross-linked properties such as tensile strength.

SUMMARY OF THE INVENTION

Formulated elastomeric compositions have now been discovered to have improved green strength over compositions formulated from either conventional linear ethylene/propene or ethylene/1-butene copolymers.

The compositions comprise:

a) at least one substantially linear ethylene/α-olefin copolymer, at least one curing agent, and at least one filler, wherein the α-olefin is a $C_3$–$C_{20}$ α-olefin; or b) at least one linear ethylene/α-olefin copolymer, at least one curing agent, and at least one filler, wherein the α-olefin is a $C_5$–$C_{20}$ α-olefin.

The substantially linear ethylene/α-olefin polymers are not "linear" polymers in the traditional sense of the term, as used to describe linear low density polyethylene, nor are they highly branched polymers, as used to describe low density polyethylene. Surprisingly, however, the substantially linear olefin polymers have the process ability similar to highly branched low density polyethylene, but the strength in toughness of linear low density polyethylene.

The substantially linear ethylene/α-olefin copolymers process are characterized as having:

a) a melt flow ratio, $I_{10}/I_2$, $\geq 5.63$, b) a molecular weight distribution, $M_w/M_n$, defined by the equation: $M_w/M_n \leq (I_{10}/I_2) - 4.63$, and c) a critical shear rate at onset of surface melt fracture of at least 50 percent greater than the critical shear rate at the onset of surface melt fracture of a linear olefin copolymer having about the same $I_2$ and $M_w/M_n$.

The substantially linear ethylene/α-olefin copolymers can also be characterized as having:

a) melt flow ratio, $I_{10}/I_2$, $\geq 5.63$, b) a molecular weight distribution, $M_w/M_n$, defined by the equation: $M_w/M_n \leq (I_{10}/I_2) - 4.63$, and c) a processing index (PI) less than or equal to about 70% of the PI of a linear olefin copolymer having about the same $I_2$ and $M_w/M_n$.

Alternately, the compositions described herein comprise linear ethylene/α-olefin copolymers, wherein the α-olefin is an α-olefin higher than $C_4$ (i.e., 1-butene). Higher α-olefins (e.g., $C_5$–$C_{20}$), when copolymerized with ethylene such that the polymers have the properties described herein, have been discovered to impart better physical properties to the formulated compositions than do the lower α-olefins ($C_4$ and $C_3$).

In another aspect, the invention is a process of improving the physical properties of a cured formulated elastomeric composition, comprising the steps of:

(A) blending at least one substantially linear ethylene/$C_3$–$C_{20}$ α-olefin copolymer, or alternately, at least one linear ethylene/$C_5$–$C_{20}$ α-olefin copolymer, with at least one curing agent and at least one filler to form an uncured composition, (B) forming a structure with the uncured composition of (A), and (C) curing the structure of (B).

The formulated compositions described herein have good green strength and maintain adequate modulus, relative to conventional linear ethylene/propene copolymers or linear ethylene/1-butene copolymers when incorporated at about the same levels.

DETAILED DESCRIPTION OF THE INVENTION

The term "substantially linear" ethylene/α-olefin polymers means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin polymers and interpolymers of the present invention are herein defined as in copending application Ser. No. 07/776,130 filed on Oct. 15, 1991, now U.S. Pat. No. 5,272,236 and in copending application entitled "Elastic Substantially Linear Olefin Polymers" filed Sep. 2, 1992 in the names of Shih-Yaw Lai, George W. Knight, John R. Wilson and James C. Stevens. The substantially linear ethylene/α-olefin polymers and interpolymers useful for forming the compositions described herein are those in which the comonomer is randomly distributed within a given interpolymer molecule and wherein substantially all of the interpolymer molecules have the same ethylene/comonomer ratio within that interpolymer.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

Long chain branching is determined by using $^{13}C$ nuclear magnetic resonance (NMR) spectroscopy and is quantified using the method of Randall (*Rev. Macromol.Chem. Phys.*, C29 (2&3), p. 285–297), the disclosure of which is incorporated herein by reference.

The substantially linear ethylene/α-olefin polymers or copolymers for use in the present invention are interpolymers of ethylene with at least one $C_3$–$C_{20}$ α-olefin and/or $C_4$–$C_{18}$ diolefins. Interpolymers of ethylene and 1-octene are especially preferred. The term "interpolymer" is used herein to indicate a copolymer, or a terpolymer, or the like. That is, at least one other comonomer is polymerized with ethylene to make the interpolymer.

Other unsaturated monomers usefully copolymerized with ethylene include, for example, ethylenically unsaturated monomers, conjugated or nonconjugated dienes, polyenes, etc. Preferred comonomers include the $C_3$–$C_{20}$ α-olefins especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The term "linear ethylene/α-olefin copolymers" means that the olefin copolymer does not have long chain branching. That is, the linear ethylene/α-olefin copolymer has an absence of long chain branching, as for example the linear low density polyethylene polymers or linear high density polyethylene polymers made using uniform branching distribution polymerization processes (e.g., U.S. Pat. No. 3,645,992 (Elston), the disclosure of which is incorporated herein by reference) and are those in which the comonomer is randomly distributed within a given interpolymer molecule and wherein substantially all of the interpolymer molecules have the same ethylene/comonomer ratio within that interpolymer. The term "linear ethylene/α-olefin polymers" does not refer to high pressure branched (free-radical polymerized) polyethylene which is known to those skilled in the art to have numerous long chain branches. The linear ethylene/α-olefin polymers are ethylene/α-olefin interpolymers having a short chain branching distribution index (SCBDI) greater than about 30 percent. The α-olefin is at least one $C_5$–$C_{20}$ α-olefin (e.g., 1-pentene, 4-methyl-1-pentene, 1-hexene, 1-octene and the like), preferably wherein at least one of the α-olefins is 1-octene. The linear ethylene/α-olefin polymers have a single melting point, as opposed to traditional Ziegler polymerized polymers having two or more melting points, as determined using differential scanning calorimetry (DSC).

The density of the linear or the substantially linear olefin polymers or copolymers (as measured in accordance with ASTM D-792) for use in the present invention is generally less than about 0.94 g/cm$^3$, preferably from about 0.85 g/cm$^3$ to about 0.9 g/cm$^3$, and especially from about 0.86 g/cm$^3$ to about 0.89 g/cm$^3$. The density of the linear or the substantially linear olefin polymers or copolymers used in the present invention is generally dependent upon the amount and the type of oil compounded into the formulation. Generally, the higher the oil content, the lower the density of the copolymer used in the formulation.

Additionally, the density of the linear or substantially linear ethylene/α-olefin polymer has been discovered to influence or control the cure properties of the final composition. The higher the density of the linear or substantially linear ethylene/α-olefin polymer, the higher the rare of cure of the formulated composition (i.e., delta torque divided by delta time) measured by increased torque using an Oscillating Disk Rheometry (ODR)) and the higher the extent or degree of cure (as determined by testing the final torque or molecular weight of the cross-linked matrix/composition), holding the polymer molecular weight, and level of peroxide used about constant.

Generally, the amount of the linear or the substantially linear olefin polymer incorporated into the composition is from about 10 percent to about 95 percent, by weight of the composition, preferably about 20 percent to about 80 percent, by weight of the composition, and especially from about 25 percent to about 65 percent, by weight of the composition.

The molecular weight of the linear or the substantially linear olefin polymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the substantially linear olefin polymers useful herein is generally from about 0.01 grams/10 minutes (g/10 min) to about 30 g/10 min, preferably from about 0.05 g/10 min to about 10 g/10 min, and especially from about 0.1 g/10 min to about 5 g/10 min.

Another measurement useful in characterizing the molecular weight of the substantially linear olefin polymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. Generally, the $I_{10}/I_2$ ratio for the linear is at least about 5.63, preferably at least about 7, especially at least about 8 or above. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above.

Other additives such as antioxidants (e.g., hindered phenolics (e.g., Irganox® 1010 made by Ciba Geigy Corp.), phosphites (e.g., Irgafos® 168)), cling additives (e.g., PIB), antiblock additives, pigments, fillers, coupling agents (e.g., vinyl-tris(2 methoxyethoxy)-silane (A-172 made by Union Carbide) and the like can also be included in the formulations, to the extent that they do not interfere with the enhanced formulation properties discovered by Applicants.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the polymers described herein, the PI is the apparent viscosity (in kpoise) of a material measured by GER at an apparent shear stress of $2.15 \times 10^6$ dyne/cm$^2$. The novel polymers described herein preferably have a PI in the range of about 0.01 kpoise to about 50 kpoise, preferably about 15 kpoise or less. The novel substantially linear olefin polymers described herein for use ion the have a PI less than or equal to about 70% of the PI of a comparative linear olefin polymer at about the same $I_2$ and $M_w/M_n$.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear olefin polymers is at least 50 percent greater than the critical shear rate at the onset of surface melt fracture of a linear olefin polymer having about the same $I_2$ and $M_w/M_n$. Gross melt fracture occurs at unsteady flow conditions and ranges in detail from regular (alternating rough and smooth, helical, etc.) to random distortions. The critical shear rate at onset of surface melt fracture (OSMF) and onset of gross melt fracture (OGMF) will be used herein based on the changes of surface roughness and configurations of the extrudates extruded by a GER.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the linear and for the substantially linear olefin polymers of the present invention is preferably greater than about 30 percent, especially greater than about 50 percent.

Molecular Weight Distribution Determination of the Linear or Substantially Linear Olefin Polymers The linear or substantially linear olefin interpolymer product samples are analyzed by gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For both the linear and the substantially linear ethylene/α-olefin polymers, the $M_w/M_n$ is preferably from about 1.5 to about 2.5, especially about 2.

The Substantially Linear Olefin Polymers

The substantially linear ethylene/α-olefin polymers are made by using suitable constrained geometry catalysts, preferably constrained geometry catalysts as disclosed in U.S. application Ser. Nos.: 545,403, filed Jul. 3, 1990 pending; 758,654, filed Sep. 12, 1991 now U.S. Pat. No. 5,132,380; 758,660, filed Sep. 12, 1991 now abandoned; and 720,041, filed Jun. 24, 1991 now abandoned, the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

Polymerization of the Substantially Linear Ethylene/α-Olefin Polymer

The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers of the present invention, such as those disclosed in U.S. Pat. No. 3,914,342, incorporated herein by reference. The multiple reactors can be operated in series or in parallel, with at least one constrained geometry catalyst employed in one of the reactors.

The Formulated Compositions

The compositions disclosed herein generally comprise: the copolymer in amounts of about 10–95% (by total formulation weight); at least one (active (i.e., imparting a particular property, e.g., ignition or inactive (i.e., used primarily as a cost reducer)) filler (e.g., carbon black or mineral fillers (e.g., aluminum trihydrate (ATH), calcium carbonate, or silicon treated day (e.g., Whitex clay made by Freeport Kaolin))); an optional process oil(s) (e.g., paraffinic oil (e.g., Sunpar™ 2280 made by Sun Oil Company); an optional process aid(s) (e.g., paraffin wax, stearic acid); at least one curing agent (e.g., a peroxide (e.g., VULCUP™ 40 KE (a,a'-bis(t-butylperoxy)-diisopropylbenzene made by Hercules, Inc.), Di-cup™ (a series of vulcanizing and polymerization agents containing dicumyl peroxide made by Hercules, Inc.), Lupersol™ (1,1,-bis-t-butylperoxy)-3,3,5 trimethylcyclohexane made by Atochem, North America) or Trigonox™ (an organic peroxide made by Noury Chemical Corporation)); other curing agents, e.g., radiation curing (β), can also be used to cure the compositions disclosed herein); and an optional coagent (e.g., triallyl cyanurate (TAC), made by American Cyanamide; SR-350, a trimethylpropane trimethacrylate made by Sartomer Resins, Inc.).

Lower peroxide levels can also be used in the compositions disclosed herein without loss of physical properties, which is especially beneficial since the peroxide is usually the highest cost component of the formulation.

The formulations are compounded by any convenient method, including dry blending the individual components and subsequently melt mixing or by pre-melt mixing in a separate extruder (e.g., a Banbury mixer, a Haake mixer, a Brabender internal mixer, or a twin screw extruder).

There are many types of molding operations which can be used to form useful fabricated articles or parts from the formulations disclosed herein, including various injection molding processes (e.g., that described in *Modern Plastics Encyclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia*/89, Mid October 1988 Issue, Volume 65, Number 11, pp. 217–218 "Extrusion-Blow Molding", the disclosure of which is incorporated herein by reference), profile extrusion, calendering, pultrusion and the like. Some of the fabricated articles include automotive hoses, single ply roofing, and wire and cable voltage insulation and jackets.

Experimental

For each of the examples (unless otherwise specified) and the comparative examples, a blend containing 100 parts (by weight of the total composition) of the selected polymer, 100 parts of a filler (carbon black N550), 50 parts of a process oil (Sunpar™ 2280), 5 parts of a paraffin wax process aid, 1 part of a stearic acid process aid, 8 parts of a peroxide (VULCUP 40KE, 40% peroxide on a Burgess KE day sold by Hercules, Inc.) and 1.5 parts of a coagent (triallyl cyanurate, TAC) are compounded on a Haake mixer, a Banbury mixer, or a Brabender internal mixer. The mixer is selected according to the expected sample size. For each sample, the mixing bowl is preheated to about 80° C. A premix is made comprising filler and process oil and aids. The premix is added to the internal mixer first (upside down mix) and the selected polymer is then added and allowed to masticate. The cure package is then added (note: the cure package can be added with the premix). The entire mixture is mixed until a bowl temperature of 110° C. is reached, when the compound is then dropped from the mixer. The formulation is optionally passed through a roll mill until the formulation is consistent in appearance.

The formulations are tested both in the uncured state and in the cured state. The uncured formulations are formed into plaques by compression molding at 260° F. for 5 minutes. The formulations are cured by placing the compression molded blankets into a mold and compression mold cured at 350° F. for 24 minutes The tests performed on the various formulations include: ODR (which provides a measure of cure in the elastomeric compound, per ASTM D-2084-75, incorporated herein by reference); stress-strain of cured and uncured compounds; and other physical properties of the cured compound. Mooney viscosity, measured using a shear rheometer which obtains a minimum Mooney torque viscosity and may be used to obtain scorch and compound cure characteristics, (per ASTM D 1646-89, incorporated herein by reference) is run on the uncured samples and other tests are also performed if the sample size allows.

EXAMPLES 1–3

Examples 1–3 use an ethylene/1-octene copolymer produced using the constrained geometry catalyst technology described earlier, using a continuous process, having $I_2$ of about 0.63 g/10 minutes and a density of about 0.8697 g/cm$^3$. The neat (i.e., uncompounded and uncured) polymer, as well as the compounded formulation and cured (using 100% of the peroxide (i.e., 8 parts)) formulation physical properties are shown in Table 1:

TABLE 1

|  | Neat | Compounded ("Green") | Cured |
|---|---|---|---|
| Tensile Strength (psi) | 1581 | 1629 | 2053 |
| 100% Modulus* | 334 | 467 | 996 |
| Elongation at break (%) | 821 | 915 | 252 |

*Stress at 100% strain

Examples 2 and 3 are also run using 90% of the peroxide and 80% of the formulated peroxide, with the polymer described for Example 1. The physical properties of the compounded formulations and the cured formulations is shown in Table 2:

TABLE 2

|  | Example 2 Compounded ("Green") (90% peroxide) | Example 3 Compounded ("Green") (80% peroxide) | Ex. 2 Cured (90% peroxide) | Ex. 3 Cured (80% peroxide) |
|---|---|---|---|---|
| Tensile Strength (psi) | 1579 | 1544 | 2110 | 2123 |
| 100% Modulus* | 465 | 479 | 931 | 900 |
| Elongation at break (%) | 853 | 832 | 312 | 325 |

*Stress at 100% strain

Comparing the physical properties for both the compounded "green" formulations of the 100% peroxide cured compositions of Example 1 with the properties of the 90% and 80% peroxide cured compositions of Examples 2 and 3, lower quantities of the peroxide can be used in the novel formulations of the invention and still maintain adequate physical properties of the composition, both in the uncured ("green") formulations and in the cured formulations.

EXAMPLE 4 AND COMPARATIVE EXAMPLE 5

Example 4 incorporates a substantially linear ethylene/1-octene copolymer produced using the constrained geometry catalyst technology described earlier in a continuous polymerization process having $I_2$ of about 0.5 g/10 minutes and a density of about 0.8695 g/cm$^3$.

Comparative Example 5 incorporates Vistalon™ 707, an ethylene/propene elastomer having a density of about 0.87 g/cm$^3$ and $I_2$ of about 0.4 g/10 minutes sold by Exxon Chemical.

Physical properties of the resultant uncured and cured compositions is shown in Table 3:

TABLE 3

|  | Example 4 Compounded ("Green") | Comparative Example 5 Compounded ("Green") | Ex. 4 Cured | Comp. Ex. 5 Cured |
|---|---|---|---|---|
| Tensile Strength (psi) | 1637 | 459 | 2223 | 1569 |
| 100% Modulus* | 429 | 231 | 937 | 609 |
| Elongation at break (%) | 870 | 685 | 302 | 310 |

As the data indicate, the composition of the invention has better uncured and cured properties, especially tensile strength and modulus, than a composition made using a commercial ethylene/propene elastomer having about the same melt index and density.

EXAMPLE 6 AND COMPARATIVE EXAMPLE 7

Example 6 incorporates a substantially linear ethylene/1-octene copolymer produced using the constrained geometry catalyst technology described earlier in a continuous polymerization process having $I_2$ of about 0.63 g/10 minutes, $M_w/M_n$ of about 2, $I_{10}/I_2$ of about 7.8, and a density of about 0.8697 g/cm$^3$.

Comparative Example 7 incorporates Tafmer™ P-0680, a linear ethylene/propene elastomer having a density of about 0.867 g/cm$^3$, $I_2$ of about 0.4 g/10 minutes, $M_w/M_n$ of about 2, and $I_{10}/I_2$ of about 6.23, sold by Mitsui PetroChemical.

Physical properties of the resultant uncured and cured compositions is shown in Table 4:

TABLE 4

|  | Example 6 Compounded ("Green") | Comparative Example 7 Compounded ("Green") | Ex. 6 Cured | Comp. Ex. 7 Cured |
|---|---|---|---|---|
| Tensile Strength (psi) | 1629 | 356 | 2053 | 1734 |
| 100% Modulus* | 467 | 231 | 996 | 496 |
| Elongation at break (%) | 915 | 490 | 252 | 301 |

As the data indicate, the composition of the invention has better uncured and cured properties, especially tensile strength and modulus, than a composition made using a linear ethylene/propene copolymer having about the same melt index, density and $M_w/M_n$, but differing melt flow ratio ($I_{10}/I_2$).

EXAMPLE 8 AND COMPARATIVE EXAMPLE 9

Example 8 incorporates an ethylene/propene copolymer produced using the constrained geometry catalyst technology described earlier in a continuous polymerization process, and has an $I_2$ of about 1 g/10 minutes and a density of about 0.87 g/cm$^3$.

Comparative Example 9 incorporates Vistalon™ 7000, an ethylene/propene/diene elastomer having a density of about 0.875 g/cm$^3$ and $I_2$ of about 0.06 g/10 minutes sold by Exxon Chemical. Note that the molecular weight (as indicated by lower $I_2$) of the Vistalon™ 7000 is considerably higher than that of the ethylene/propene copolymer used in Example 8, but that the physical properties of the formulated compositions of Example 8 are at least as good as or better than those of the formulated compositions of Comparative Example 9.

Physical properties of the resultant uncured and cured compositions is shown in Table 5:

TABLE 5

|  | Example 8 Compounded ("Green") | Comparative Example 9 Compounded ("Green") | Ex. 8 Cured | Comp. Ex. 9 Cured |
|---|---|---|---|---|
| Tensile Strength (psi) | 450 | 401 | 1068 | 1193 |
| 100% Modulus* | 297 | 313 | 692 | 707 |
| Elongation at break (%) | 993 | 458 | 259 | 251 |

EXAMPLES 10–12

Example 10 incorporates a substantially linear ethylene/1-octene copolymer produced using the constrained geometry catalyst technology described earlier in a continuous polymerization process having $I_2$ of about 0.99 g/10 minutes, $M_w/M_n$ of about 1.917, $I_{10}/I_2$ of about 7.5, and a density of about 0.871 g/cm$^3$.

Example 11 incorporates a substantially linear ethylene/1-octene copolymer produced using the constrained geometry catalyst technology described earlier in a continuous polymerization process having $I_2$ of about 0.88 g/10 minutes, $M_w/M_n$ of about 2.016, $I_{10}/I_2$ of about 8.0, and a density of about 0.88 g/cm$^3$.

Example 12 incorporates a substantially linear ethylene/1-octene copolymer produced using the constrained geometry catalyst technology described earlier in a continuous polymerization process having $I_2$ of about 0.83 g/10 minutes, $M_w/M_n$ of about 2.201, $I_{10}/I_2$ of about 8.5, and a density of about 0.902 g/cm$^3$.

For Examples 10–12, the composition comprised 100 parts of the selected polymer, 130 parts of ATH (alumina trihydrate, a mineral filler used to reduce the formulation cost and as a flame retardant), 7.5 parts of VULKUP 40KE (40% peroxide on a Burgess KE clay used as a curing agent) and 1.2 parts of TAC (triallyl cyanurate, an organic coagent used to enhance the cure rate/state). Table 6 shows the minimum (ML) and maximum (i.e., plateau) torque (MH) values for the compositions as they cure and the difference between the torque values (used as the measure of the final cure state), as described in ASTM D 2084-75, for Examples 10–12. For these Examples, the time to reach 90% of the final cure state (T90) is defined using the equation:

$$Mc_{90} = 0.9(MH-ML) + ML).$$

$T_{90}$ is the time to reach $Mc_{90}$. For Examples 10–12, $T_{90}$ is about 5.9 minutes.

TABLE 6

|  | Ex. 10 | Ex. 11 | Ex. 12 |
|---|---|---|---|
| Minimum Torque (lb-inch) | 16 | 15 | 17 |
| Maximum Torque (lb-inch) | 165 | 182 | 190 |
| Torque Difference | 149 | 167 | 173 |
| Rate of Torque Increase (torque difference divided by $T_{90}$) (lb-in/minute) | 25.3 | 28.3 | 29.3 |

As the data indicate, the torque difference increases with increasing density of the polymer selected for use in the composition. Increasing the torque corresponds to improved cure properties of composition. Thus, the cure process of the composition can be controlled by varying the density of the selected polymer. The rate of torque also increases with increasing polymer density.

We claim:

1. A formulated elastomeric composition consisting essentially of from about 10 to about 95 weight percent of at least one homogeneous linear ethylene/α-olefin copolymer, at least one curing agent, and at least one filler, wherein the α-olefin is a $C_5$–$C_{20}$ α-olefin, and wherein the copolymer has a density of about 0.86 to about 0.89 g/cm$^3$.

2. The composition of claim 1 wherein the α-olefin is 1-octene.

3. A fabricated article made from the composition of claim 1.

4. The composition of claim 1, wherein the homogeneous linear ethylene/α-olefin copolymer is characterized as having a single melting point by differential scanning calorimetry (DCS).

5. The composition of claim 1, wherein the homogeneous linear ethylene/α-olefin copolymer is characterized as having a composition distribution breadth index (CDBI) of at least about 30.

6. The fabricated article of claim 3, wherein the fabricated article is selected from the group consisting of automotive hoses, single ply roofing, and wire and cable voltage insulation.

7. The composition of claim 1, wherein the at least one linear ethylene/α-olefin copolymer is provided in an amount of from about 20 to about 80 weight percent.

8. The composition of claim 1, wherein the at least one linear ethylene/α-olefin copolymer is provided in an amount of from about 25 to about 65 weight percent.

9. The composition of claim 1, wherein the at least one filler is selected from the group consisting of ignition resistant fillers, carbon black, mineral fillers, aluminum trihydrate, calcium carbonate, and silicon treated clay.

10. The composition of claim 1, wherein the α-olefin is 1-hexene.

11. The composition of claim 1, wherein the α-olefin is 1-pentene.

12. The composition of claim 1, wherein the α-olefin is 4-methyl-1-pentene.

* * * * *